US008446597B2

(12) United States Patent
Enami et al.

(10) Patent No.: US 8,446,597 B2
(45) Date of Patent: May 21, 2013

(54) IMAGE FORMING APPARATUS, IMAGE FORMING METHOD, AND COMPUTER PROGRAM PRODUCT INCLUDING A SECONDARY-TRANSFER CONTROL UNIT THAT TRANSFERS A SINGLE-COLOR IMAGE ONTO THE INTERMEDIATE TRANSFER MEDIUM

(75) Inventors: Takashi Enami, Kanagawa (JP); Takahiro Kamekura, Kanagawa (JP); Nobuyuki Kobayashi, Kanagawa (JP); Shigeyuki Ishii, Kanagawa (JP); Jun Kosako, Kanagawa (JP); Natsuko Kawase, Kanagawa (JP); Takahiro Miyakawa, Kanagawa (JP); Miyo Taniguchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 562 days.

(21) Appl. No.: 12/787,678

(22) Filed: May 26, 2010

(65) Prior Publication Data

US 2010/0302569 A1 Dec. 2, 2010

(30) Foreign Application Priority Data

May 26, 2009 (JP) ................................ 2009-126758
Apr. 26, 2010 (JP) ................................ 2010-101114

(51) Int. Cl.
*G06K 15/00* (2006.01)

(52) U.S. Cl.
USPC ............. 358/1.12; 358/1.18; 399/6; 399/299; 399/301; 399/302; 347/115; 347/116

(58) Field of Classification Search
USPC .................... 358/1.12, 1.18; 399/6, 299, 301, 399/302; 347/115, 116
See application file for complete search history.

(56) References Cited

U.S. PATENT DOCUMENTS 7,548,704 B2 6/2009 Hasegawa et al.
7,616,909 B2 11/2009 Kato et al.

(Continued)

FOREIGN PATENT DOCUMENTS

JP 2001-175091 6/2001
JP 2004-205943 7/2004

(Continued)

OTHER PUBLICATIONS

U.S. Appl. No. 12/708,901, filed Feb. 19, 2010, Kosako, et al.

(Continued)

*Primary Examiner* — Qian Yang
(74) *Attorney, Agent, or Firm* — Oblon, Spivak, McClelland, Maier & Neustadt, L.L.P.

(57) ABSTRACT

An image forming apparatus includes a direct-transfer control unit that causes a direct-transfer medium and a first image forming unit that forms a single-color image to transfer the single-color image onto either the direct-transfer medium or a transfer sheet; an indirect-transfer control unit that causes an intermediate transfer medium and a second image forming unit that forms a multi-color image to transfer the multi-color image onto the intermediate transfer medium; a secondary-transfer control unit that transfers the single-color image onto the intermediate transfer medium; a sensor that detects an image on the intermediate transfer medium; and a positional-alignment control unit that calculates, using the sensor, an amount of misalignment of the image and corrects, using a position of an image formed by the first image forming unit as a reference position, positions of images to be formed by the second image forming unit based on the calculated amount of misalignment.

8 Claims, 8 Drawing Sheets

U.S. PATENT DOCUMENTS

| | | | | |
|---|---|---|---|---|
| 8,249,468 | B2 * | 8/2012 | Kuma et al. | 399/21 |
| 2006/0188299 | A1 * | 8/2006 | Matsumoto | 399/302 |
| 2007/0242971 | A1 * | 10/2007 | Goto | 399/82 |
| 2009/0022525 | A1 * | 1/2009 | Martin et al. | 399/298 |

FOREIGN PATENT DOCUMENTS

| | | |
|---|---|---|
| JP | 2004-205944 | 7/2004 |
| JP | 2005-215459 | 8/2005 |
| JP | 2006-85138 | 3/2006 |
| JP | 2006-126643 | 5/2006 |
| JP | 2008-90092 | 4/2008 |

OTHER PUBLICATIONS

U.S. Appl. No. 12/780, 346, May 14, 2010, Kamekura, et al.

* cited by examiner

IMAGE FORMING APPARATUS, IMAGE FORMING METHOD, AND COMPUTER PROGRAM PRODUCT INCLUDING A SECONDARY-TRANSFER CONTROL UNIT THAT TRANSFERS A SINGLE-COLOR IMAGE ONTO THE INTERMEDIATE TRANSFER MEDIUM

CROSS-REFERENCE TO RELATED APPLICATIONS

The present application claims priority to and incorporates by reference the entire contents of Japanese Patent Application No. 2009-126758 filed in Japan on May 26, 2009 and Japanese Patent Application No. 2010-101114 filed in Japan on Apr. 26, 2010.

BACKGROUND OF THE INVENTION

1. Field of the Invention

The present invention relates to an image forming apparatus, an image forming method, and a computer program product.

2. Description of the Related Art

In accordance with market demand, electrophotographic devices that can output color images, such as color copiers and color printers, are used more and more. Especially, with the demand for color-image outputting speeds as high as monochrome-image outputting speeds, tandem-type color-image forming apparatuses that include color-based photosensitive elements and color-based developing devices have recently become mainstream. The tandem-type color-image forming apparatuses form toner images with different single colors on individual photosensitive elements and then sequentially transfer the single-color toner images onto a transfer sheet, thereby recording a color image (see, for example, Japanese Patent Application Laid-open No. 2006-126643).

In a typical tandem-type color-image forming apparatus, regardless of whether it is a direct-transfer type or an intermediate-transfer type, the single-color images are transferred from the individual photosensitive elements, at different positions on an intermediate transfer belt, to the intermediate transfer belt or the transfer sheet; therefore, even a fine change in the moving speed of the intermediate transfer belt alters the timing at which the intermediate transfer belt reaches the transfer position of the next single-color image, which in turn causes the transfer positions of the single-color images to shift from the correct positions, which in turn results in an output image with misalignment (color shift) in the sub-scanning direction.

A typical tandem-type color-image forming apparatus includes writing units separated from each other on the basis of color. If the constituents are displaced from the correct positions due to an environmental change, such as a temperature change, which in turn changes the magnifying power and the writing position, an output image with misalignment in the main-scanning direction is formed.

A typical image forming apparatus that includes both a direct-transfer system and an indirect-transfer system calculates, using a sensor, the amounts of misalignment of positional alignment patterns that are formed on the intermediate transfer belt and adjusts the positions of the multi-color images to be formed by the indirect-transfer system in the same manner as adjustments are made in an indirect-type image forming apparatus. Moreover, an image forming apparatus that includes both a direct-transfer system and an indirect-transfer system needs to adjust the relation between the position of a black image that is formed by the direct-transfer system and the positions of multi-color images.

Therefore, as well as the positional-alignment sensor that is arranged on the intermediate transfer belt in the indirect-transfer system and is used in the adjustment of the positions of the multi-color images, another positional alignment sensor is also needed in the direct-transfer system. This other positional alignment sensor is used in the adjustment of the relation between the position of the image that is formed by the direct-transfer system and the position of the image that is formed by the indirect-transfer system. Because two sensors are included, the number of necessary parts increases, which results in a more complicated configuration and more complicated maintenance operations.

In some of the image forming apparatuses that include both the direct-transfer system and the indirect-transfer system, the image forming units and the intermediate transfer belt of the indirect-transfer system are designed so that they are detachable from the main body. Such an image forming apparatus can become a monochrome image forming apparatus when only the image forming unit of the direct-transfer system is operable. When such an image forming apparatus is used as a monochrome image forming apparatus, because a monochrome image is formed, the two positional-alignment sensors are unnecessary. From the design perspective, it is necessary for both the positional-alignment sensors and the image forming units of the indirect-transfer system to be detachable from the main body, which results in a complicated attachment/detachment operation.

Japanese Patent Application Laid-open No. 2006-126643 discloses a technology related to an image forming apparatus that can reduce the printing time in the monochrome mode and increase the accuracy in positional alignment for color printing. The image forming unit for black has an indirect-transfer mode and a direct-transfer mode. During color-image forming, the image forming unit for black is set to the indirect-transfer mode and the images of different colors including black are transferred onto the intermediate transfer medium in a superimposed manner.

However, in the image forming apparatus that includes both an indirect-transfer system and a direct-transfer system according to the technology disclosed in Japanese Patent Application Laid-open No. 2006-126643, the sensors are still needed in both the indirect-transfer system and the direct-transfer system.

SUMMARY OF THE INVENTION

It is an object of the present invention to at least partially solve the problems in the conventional technology.

According to an aspect of the present invention, there is provided an image forming apparatus that includes a direct-transfer control unit that causes a direct-transfer medium and a first image forming unit that forms a single-color image to transfer the single-color image onto either the direct-transfer medium or a transfer sheet, wherein both the direct-transfer medium and the transfer sheet move due to rotation of the direct-transfer medium; an indirect-transfer control unit that causes an intermediate transfer medium and a second image forming unit that forms a multi-color image to transfer the multi-color image onto the intermediate transfer medium; a secondary-transfer control unit that transfers, as a secondary transfer and after the single-color image has been transferred onto the direct-transfer medium under the control of the direct-transfer control unit, the single-color image onto the intermediate transfer medium; a sensor that detects an image on the intermediate transfer medium; and a positional-alignment control unit that calculates, using the sensor, an amount of misalignment of the image and corrects, using a position of an image formed by the first image forming unit as a reference position, positions of images to be formed by the second image forming unit in accordance with the calculated amount of misalignment.

According to another aspect of the present invention, there is provided an image forming method performed by an image forming apparatus that includes a sensor and detects an image on an intermediate transfer medium using the sensor. The image forming method includes transferring, by both a direct-transfer medium and a first image forming unit that forms a single-color image, the single-color image onto either the direct-transfer medium or a transfer sheet, wherein both the direct-transfer medium and the first image forming unit are under the control of a direct-transfer control unit and both the direct-transfer medium and the transfer sheet move due to the rotation of the direct-transfer medium; transferring, by both an intermediate transfer medium and a second image forming that forms a multi-color image, the multi-color image onto the intermediate transfer medium, wherein both the indirect-transfer medium and the second image forming unit are under the control of an indirect-transfer control unit; transferring, as a secondary transfer by a secondary-transfer control unit, after the single-color image has been transferred by the direct-transfer control unit onto the direct-transfer medium, the single-color image onto the intermediate transfer medium; and calculating, by a positional-alignment control unit using the sensor, an amount of misalignment of the image and correcting, using a position of an image formed by the first image forming unit as a reference position, positions of images to be formed by the second image forming unit in accordance with the calculated amount of misalignment.

According to still another aspect of the present invention, there is provided a computer program product that causes a computer to execute the method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of image forming apparatuses, image forming methods, and computer programs according to the present invention are described in detail below with reference to the accompanying drawings.

An embodiment of the present invention is described below with reference to FIG. 1A. An image forming apparatus used in the present embodiment is a multi function peripheral (MFP) that has various functions, such as a copy function, a facsimile (FAX) function, a printer function, a scanner function, and a received-image distributing function (i.e., function to distribute an image of an original scanned by the scanner function or an image received by the printer function or the FAX function).

Figure 1A:
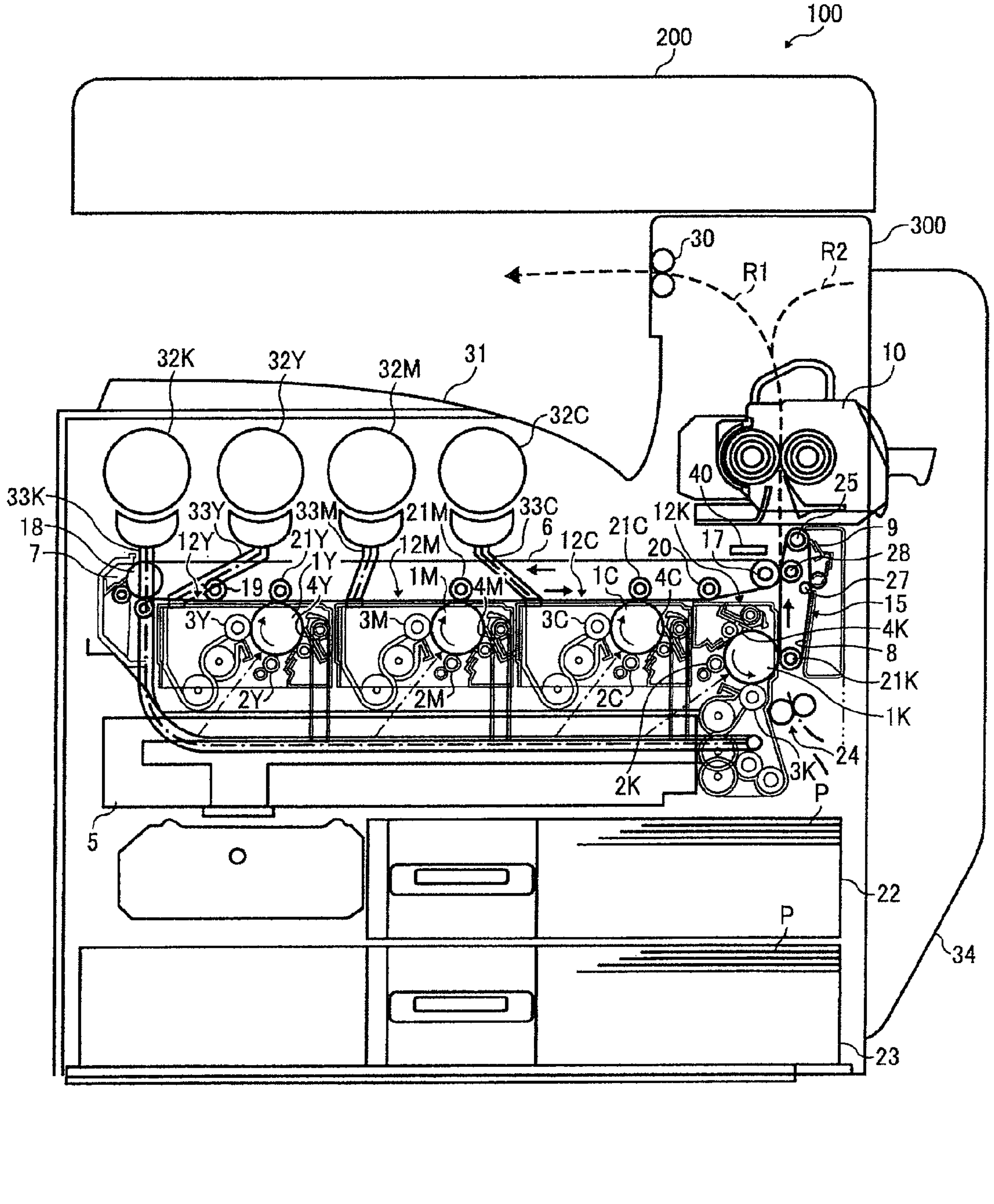
FIG. 1A is a schematic diagram of the configuration of an MFP according to an embodiment of the present embodiment.

FIG. 1A is a schematic diagram of the configuration of an MFP 100 according to an embodiment of the present embodiment. As shown in FIG. 1A, the MFP 100 includes a scanner unit 200 that is an image scanning device and a printer unit 300 that is an electrophotographic image printing device. The scanner unit 200 and the printer unit 300 together form an engine control unit 500 (see FIG. 3). The MFP 100 according to the present embodiment has the document-box function, the copy function, the printer function, and the FAX function. The user can change among these functions by operation of an application switching key of an operation unit 400 (see FIG. 3). When the document-box function is selected, the MFP 100 is in the document-box mode; when the copy function is selected, the MFP 100 is in the copy mode; when the printer function is selected, the MFP 100 is in the printer mode; and when the FAX function is selected, the MFP 100 is in the FAX mode.

The printer unit 300, which has a peculiar function of the MFP 100 according to the present embodiment, is described in detail below. The printer unit 300 included in the MFP 100, as shown in FIG. 1A, is a tandem-type printer that includes three image forming units 12Y, 12M, and 12C arranged in series along the moving direction of an intermediate transfer belt 6. The image forming units 12Y, 12M, and 12C are for yellow (Y), magenta (M), cyan (C), respectively. The intermediate transfer belt 6 is a loop-shaped intermediate transfer member extending substantially parallel to the horizontal direction. The intermediate transfer belt 6 is supported by a driving roller 17, a driven roller 18, and supporting rollers 19 and 20. A cleaning unit 7 is arranged at the position outside of the intermediate transfer belt 6 opposite to the driven roller 18. The cleaning unit 7 removes residual toners from the intermediate transfer belt 6.

The printer unit 300 of the MFP 100 further includes an image forming unit 12K for black (K) upstream of the tandem arrangement in the transfer-paper (recording-sheet) moving direction in a separate manner. The image forming unit 12K for black (K) transfers a black toner image directly to the transfer sheet P. More particularly, the image forming unit 12K for black is separated from the other image forming units 12Y, 12M, and 12C. The black toner image that is formed on the black image forming unit 12K is directly transferred onto the transfer sheet P using a secondary transfer unit 15, not onto the intermediate transfer belt 6. The secondary transfer unit 15 is substantially perpendicular to the intermediate transfer belt 6 extending in the substantially horizontal direction and is located at a position along a conveying path of the transfer sheet P at which both the multi-color image, which is formed on the intermediate transfer belt 6 in the superimposed manner, and the black image, which is transferred onto the transfer sheet P, join together in a superimposed manner. More particularly, the black image forming unit 12K is arranged near and along the substantially vertical conveying path of the transfer sheet P. The secondary transfer unit 15 is arranged in a space near the substantially vertical conveying path upstream of a fixing device 10.

Figure 2:
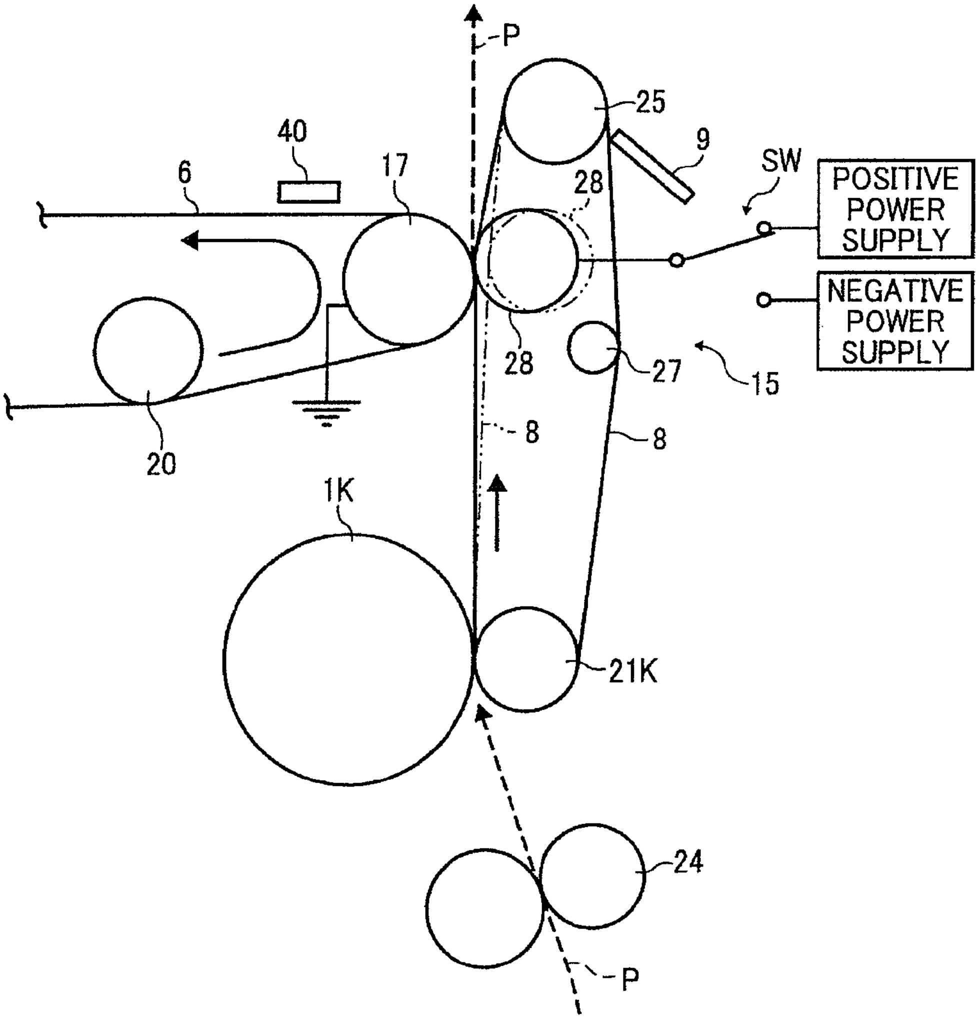
FIG. 2 is a schematic diagram that explains a system in which a secondary transfer roller moves away from an intermediate transfer belt.

FIG. 2 is a schematic diagram of the configuration of the secondary transfer unit 15. As shown in FIG. 2, the secondary transfer unit 15 includes a transfer-sheet conveying belt 8 that receives a toner image directly from the photosensitive element, a driving roller 25 that supports the transfer-sheet conveying belt 8, a driven roller 21K that works as a transfer unit, a supporting roller 27, a secondary transfer roller 28 that works as a secondary transfer means, and a cleaning device 9 that cleans the surface of the transfer-sheet conveying belt 8. The secondary transfer roller 28 is arranged opposite to the driving roller 17 of the intermediate transfer belt 6. The secondary transfer roller 28 can move close to and apart from the intermediate transfer belt 6 as indicated by the dashed-dotted lines of FIG. 2 with maintaining the surface of the transfer-sheet conveying belt 8 tight by operation of a secondary-transfer-unit moving mechanism (not shown) and the supporting roller 27.

Although, in the secondary transfer unit 15 according to the present embodiment, the secondary transfer roller 28 moves close to and apart from the intermediate transfer belt 6, the configuration is not limited thereto. It is possible to configure the entire transfer-sheet conveying belt 8 to swing about the driven roller 21K as the fulcrum.

A conventional technology is known that maintains the image carriers other than the black image carrier apart from the intermediate transfer belt during the monochrome-image forming operation. In this conventional technology, because only the intermediate transfer belt is driven, it is unnecessary to drive (idle) the image forming units other than black; however, because the intermediate transfer belt is displaced, the supporting force is subjected to change. As compared with the conventional technology, if the secondary transfer roller 28 or the entire transfer-sheet conveying belt 8 is configured displaceable, because the transfer-sheet conveying belt 8 having the circumferential length shorter than the circumferential length of the intermediate transfer belt 6 moves close to or apart from the intermediate transfer belt 6 with the intermediate transfer belt 6 being fixed (independent from the moving of the transfer-sheet conveying belt 8), the supporting force is not changed. Although it is possible to configure the intermediate transfer belt 6 having many alignment positions to move close to and apart from the transfer-sheet conveying belt 8, in such a case there is possibility that the accuracy in the positional alignment decreases with the elapse of time. As compared with the case, because the intermediate transfer belt 6 maintains in contact with photosensitive elements 1Y, 1M, and 1C in the present embodiment, it is possible to set the accuracy in the positional alignment of the rollers with the intermediate transfer belt 6 high, which improves a margin of belt skew. Moreover, the stable belt rotation improves a margin of the misalignment (color shift) in the full-color printing operation.

It is allowable to configure the driving roller 17 that supports the intermediate transfer belt 6 to displace using a moving unit (not shown) so that the intermediate transfer belt 6 moves close to and apart from the transfer-sheet conveying belt 8 with the intermediate transfer belt 6 being strained by operation of the support roller 20. In this case, because the orientation of the transfer sheet P being conveyed along the conveying path does not change, the behavior of the transfer sheet P moving between the transfer-sheet conveying belt 8 and the fixing device 10 cannot become unstable. This prevents a crease or a distorted image on the transfer sheet P discharged from the fixing device 10. Moreover, it is allowable to configure both the secondary transfer roller 28 of the secondary transfer unit 15 and the driving roller 17 that supports the intermediate transfer belt 6 movable so that the intermediate transfer belt 6 and the transfer-sheet conveying belt 8 moves close to and apart from each other.

Referring back to FIG. 1A, the image forming units 12Y, 12M, 12C, and 12K are formed as process cartridges detachable from the main body of the printer unit 300. Each image forming unit 12 (12Y, 12M, 12C, and 12K) includes a photosensitive element 1 (1Y, 1M, 1C, and 1K) that is an image carrier, a charging device 2 (2Y, 2M, 2C, and 2K), a developing device 3 (3Y, 3M, 3C, and 3K) that develops an electrostatic latent image to a toner image with toners, and a cleaning device 4 (4Y, 4M, 4C, and 4K). In the image forming units 12Y, 12M, and 12C, each of the photosensitive elements 1Y, 1M, and 1C is in contact with the lower-side extending surface of the intermediate transfer belt 6. Primary transfer rollers 21Y, 21M, and 21C that work as primary transfer means are arranged at positions inside of the intermediate transfer belt 6 opposed to the photosensitive elements 1Y, 1M, and 1C, respectively.

The printer unit 300 of the MFP 100 includes an exposure device 5 that emits laser light from an LD (not shown) to the image forming units 12Y, 12M, 12C, and 12K. Scanned data of an original obtained by the scanner unit 200, data received by FAX, or color image information received from a computer is resolved into yellow, cyan, magenta, and black; thus, data about color separation images is created. The data about color separation images is sent to the exposure device 5 of the image forming units 12Y, 12M, 12C, and 12K. The exposure device 5 emits the laser light to the photosensitive elements 1Y, 1M, 1C, and 1K in the image forming units 12Y, 12M, 12C, and 12K, thereby forming electrostatic latent images on the photosensitive elements 1Y, 1M, 1C, and 1K.

Although the cleaning devices 4 and 9 used in the present embodiment are blades, the present invention is not limited thereto. Some other cleaning devices, such as a fur brush roller and a magnetic brush cleaner, can be used. Although the exposure device 5 is a laser exposure device, some other exposure devices, such as an LED exposure device, can be used.

The printer unit 300 of the MFP 100 includes pattern detection sensors 40 on the left side, at the center, and on the right side of the intermediate transfer belt 6 with respect to the belt width direction. The pattern detection sensors 40 detects a positional alignment pattern 13 (including positional alignment patterns 13Y, 13M, 13C, and 13K) (see FIG. 8) to calculate an amount of skew etc., in the LD scanning (not shown).

As shown in FIG. 2, the pattern detection sensors 40 are arranged near the position that the intermediate transfer belt 6 passes by immediately after the image has been transferred from the transfer-sheet conveying belt 8 onto the intermediate transfer belt 6. The phrase "near the position where the intermediate transfer belt 6 passes by" indicates the position opposite to the intermediate transfer belt 6 near enough for the pattern detection sensors 40 to detect the positional alignment pattern 13 on the intermediate transfer belt 6.

With this arrangement, immediately after the positional alignment pattern 13K has been transferred onto the intermediate transfer belt 6, i.e., all the positional alignment patterns 13Y, 13M, 13C, and 13K are formed on the intermediate transfer belt 6, the pattern detection sensors 40 detect the positional alignment pattern 13. This arrangement is effective to reduce the time for the positional alignment process.

If reflection-type optical sensors (specular-reflection sensors) are used as the pattern detection sensors 40, the intermediate transfer belt 6 is exposed to light and the pattern detection sensors 40 detect the light reflected by the intermediate transfer belt 6 or the positional alignment pattern 13 that is formed on the intermediate transfer belt 6. Thus, information necessary to calculate an amount of the misalignment is obtained.

Although, in the above example, the pattern detection sensors 40 are sensors that receive specularly reflected light, some other sensors can be used. For example, a sensor unit made up of sensors that detect light diffusely reflected by the positional alignment pattern 13 or the intermediate transfer belt 6 can be used.

As a result of the positional alignment, it is possible to calculate the skew from a reference color, the registration misalignment in the sub-scanning direction, the registration misalignment in the main-scanning direction, and the magnifying power in the main-scanning direction. In an actual case, the sensors read edge parts of the positional alignment pattern 13. A process for positional alignment will be described in detail later.

Paper feed trays 22 and 23 are arranged in a lower part of the printer unit 300 of the MFP 100. The size of sheets in the paper feed tray 22 is different from the size of sheets in the paper feed tray 23. The transfer sheet P is fed by a paper feed unit (not shown) from any of the paper feed trays 22 and 23 and then conveyed by a conveyer unit (not shown) to a pair of registration rollers 24. The skew is corrected when the transfer sheet P is at the registration rollers 24. After that, the transfer sheet P is conveyed at specific timing by the registration rollers 24 to a transfer position between the photosensitive element 1K and the transfer-sheet conveying belt 8.

The printer unit 300 of the MFP 100 includes a toner tank 32. The toner tank is made up of toner tanks 32K, 32Y, 32M, and 32C. These toner tanks 32K, 32Y, 32M, and 32C are connected to the developing devices 3K, 3Y, 3M, and 3C via toner supply pipes 33K, 33Y, 33M, and 33C, respectively. Because the black image forming unit 12K is separated from the other image forming units 12Y, 12M, and 12C, toners on the photosensitive elements 1Y, 1M, and 1C cannot mix into the black image forming process. Therefore, toners collected from the photosensitive element 1K is conveyed to the black developing device 3K through a black-toner collecting path (not shown) for reuse. It is allowable to arrange a device in the middle of the black-toner collecting path to remove powders of paper or a device to switch to a disposal toner path.

Figure 1B:
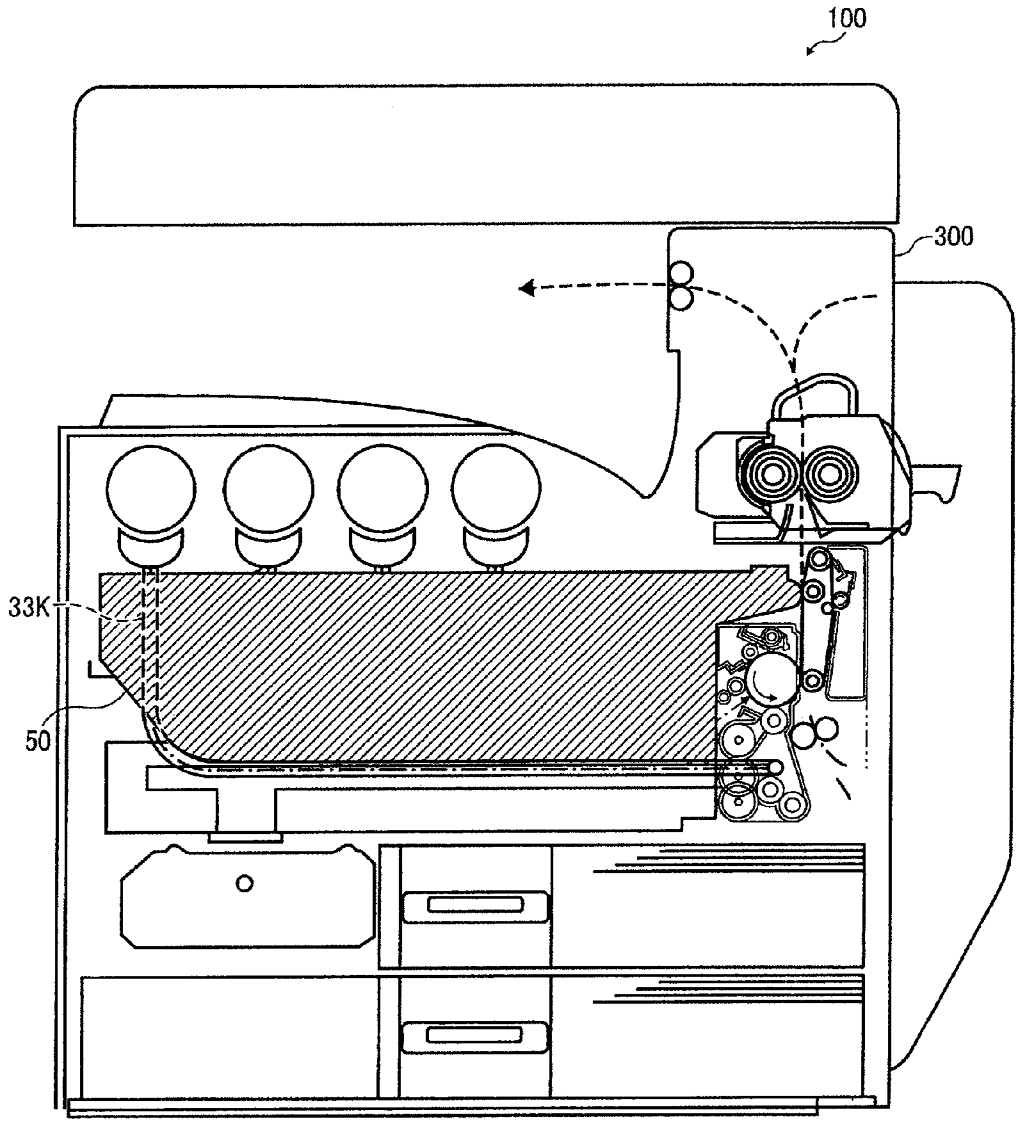
FIG. 1B is a schematic diagram of a detachable indirect transfer unit.

The members for the indirect transfer that include the image forming units 12Y, 12M, and 12C, the intermediate transfer belt 6, and the pattern detection sensors 40 together form an indirect transfer unit 50 (see FIG. 1B). The indirect transfer unit 50 is detachable from the main body of the printer unit 300.

FIG. 1B is a schematic diagram of the detachable indirect transfer unit 50. The printer unit 300 includes slide rails (not shown) on the left side and the right side of the indirect transfer unit 50. The indirect transfer unit 50 slides along the slide rails and attaches to or detaches from the printer unit 300. When the user wishes to detach the indirect transfer unit 50 from the printer unit 300, the user unlocks the slide lock (not shown) by operation of a control lever (not shown) of the indirect transfer unit 50. The user then pulls the indirect transfer unit 50 outward and detaches the indirect transfer unit 50 from the slide rails. When the user wishes to attach the indirect transfer unit 50 to the printer unit 300, the user first attaches the indirect transfer unit 50 to the slide rails and then slides the indirect transfer unit 50 inward. As shown in FIG. 1B, the toner supply pipe 33K for black keeps its position regardless whether the indirect transfer unit 50 is attached to or detached from the printer unit 300.

In the MFP 100 according to the present embodiment, the pattern detection sensors 40 and the indirect transfer unit 50 are configured as a unit, which allows easy attachment or detachment of the pattern detection sensors 40.

Moreover, with this configuration, a user can first buy an MFP with only the direct-transferring image forming unit 12K being accommodated therein and then add the indirect transfer unit 50 to the MFP if the color-printing function is required. Because the configuration of the MFP can be modified depending on the functions that the user needs, the user can introduce a low-price MFP.

Figure 3:
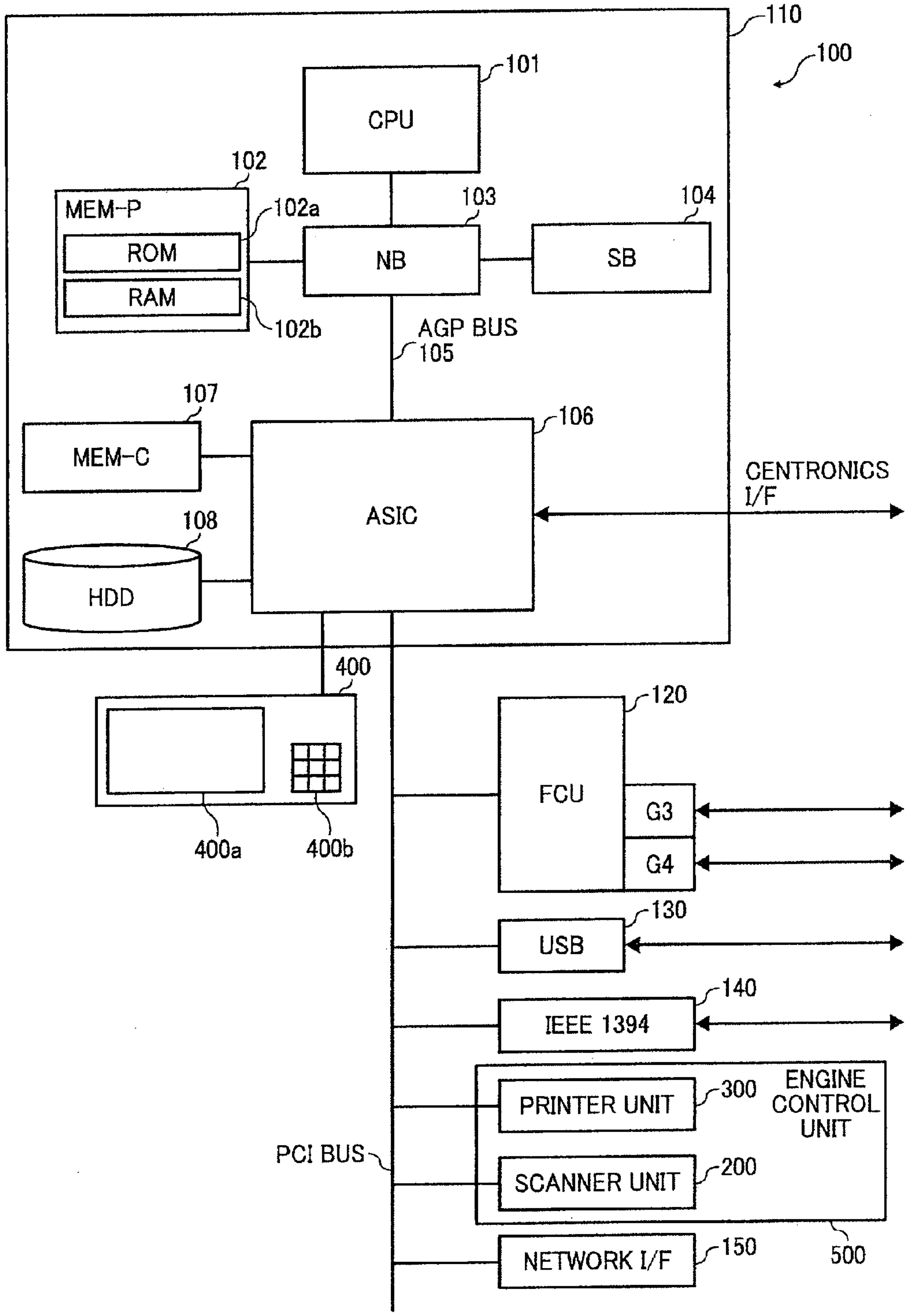
FIG. 3 is a block diagram of the hardware configuration of the MFP.

The hardware configuration of the MFP 100 is described below. FIG. 3 is a block diagram of the hardware configuration of the MFP 100. As shown in FIG. 3, the MFP 100 includes a controller 110, the printer unit 300, and the scanner unit 200 connected to each other via a peripheral component interconnect (PCI) bus. The controller 110 is a controller that controls the MFP 100, drawing operation, communications, and data received via the operation unit 400. Either the printer unit 300 or the scanner unit 200 includes an image processing unit that performs image processing, such as error diffusion or gamma conversion. The operation unit 400 includes an operation display unit 400*a* and a keyboard unit 400*b*. The operation display unit 400*a* displays original image data etc., scanned by the scanner unit 200 on the liquid crystal display (LCD) and receives an instruction from the operator via a touch panel. The keyboard unit 400*b* receives an instruction from the operator via the keys.

The controller 110 includes a central processing unit (CPU) 101 that is a main unit of the computer, a system memory (MEM-P) 102, a north bridge (NB) 103, a south bridge (SB) 104, an application specific integrated circuit (ASIC) 106, a local memory (MEM-C) 107 that is a storage unit, and a hard disk drive (HDD) 108 that is a storage unit. The NB 103 is connected to the ASIC 106 via an accelerated graphics port (AGP) bus 105. The MEM-P 102 includes a read only memory (ROM) 102*a* and a random access memory (RAM) 102*b*.

The CPU 101 controls the MFP 100. The CPU 101 has a chip set that includes the NB 103, the MEM-P 102, and the SB 104. The CPU 101 is connected to some other devices via the chip set.

The NB 103 is a bridge that connects the CPU 101 to the MEM-P 102, the SB 104, and the AGP bus 105. The NB 103 includes a memory controller that controls read/write from/to the MEM-P 102; a PCI master; and an AGP target.

The MEM-P 102 is a system memory that is used as a memory that stores therein computer programs and data, a memory on which computer programs and data are loaded, a memory for painting in the printer mode, and the like. The MEM-P 102 includes the ROM 102*a* and the RAM 102*b*. The ROM 102*a* is a read only memory that stores therein computer programs and data that are used to control the CPU 101. The RAM 102*b* is a writable and readable memory that is used as the memory on which computer programs and data are loaded and the memory for painting in the printer mode.

The SB 104 is a bridge that connects the NB 103 to PCI devices and peripheral devices. The SB 104 is connected to the NB 103 via a PCI bus. The PCI bus is connected to a network interface (I/F) 150, etc.

The ASIC 106 is an integrated circuit (IC) for image processing and has a hardware component for image processing. The ASIC 106 works as a bridge that connects the AGP bus 105, the PCI bus, the HDD 108, and the MEM-C 107 to each other. The ASIC 106 includes a PCI target, an AGP master, an arbiter (ARB) that is the main unit of the ASIC 106, a memory controller that controls the MEM-C 107, a plurality of direct memory access controllers (DMACs) that perform rotation of image data or the like using a hardware logic, etc., and a PCI unit that perform data transfer via a PCI bus between the printer unit 300 and the scanner unit 200. The ASIC 106 is connected to a Fax control unit (FCU) 120, a universal serial bus (USB) 130, an Institute of Electrical and Electronics Engineers (IEEE) 1394 I/F 140 via a PCI bus.

The MEM-C 107 is a local memory that is used as a copy image buffer and a code buffer. The HDD 108 is a storage that stores therein image data, computer programs that are used to control the CPU 101, font data, and forms.

The AGP bus 105 is a bus interface for a graphics accelerator card that is proposed to increase a graphics processing speed. With a direct access to the MEM-P 102 at a high throughput, the AGP bus 105 increases the speed of the graphics accelerator card.

The computer program that is executed by the MFP 100 according to the present embodiment is stored in a ROM or the like. The computer program that is executed by the MFP 100 according to the present embodiment can be stored, in a form of a file that is installable and executable on a computer, in a recording medium readable by the computer, such as a compact disk-read only memory (CD-ROM), a flexible disk (FD), a compact disk-recordable (CD-R), and a digital versatile disk (DVD).

On the other hand, the computer program that is executed by the MFP 100 according to the present embodiment can be stored in another computer connected to the computer via a network such as the Internet, and downloaded to the computer via the network. The computer program that is executed by the MFP 100 according to the present embodiment can be delivered or distributed via a network such as the Internet.

Figure 4:
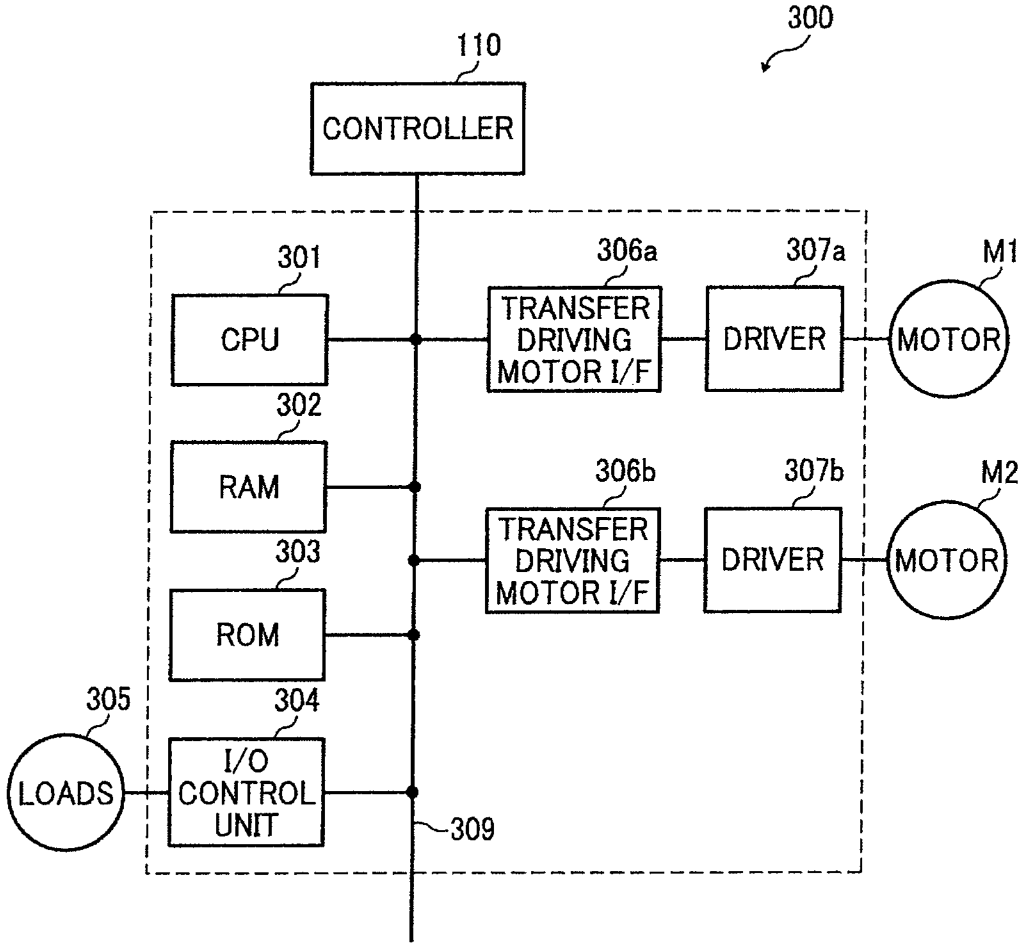
FIG. 4 is a block diagram of the hardware configuration of a printer unit.

FIG. 4 is a block diagram of the hardware configuration of the printer unit 300. As shown in FIG. 4, the control system of the printer unit 300 includes a CPU 301, a RAM 302, a ROM 303, an I/O control unit 304, a transfer driving motor I/F **306*a*, a driver 307*a*, a transfer driving motor I/F 306*b*, and a driver 307*b***.

The CPU 301 controls the printer unit 300, for example, controls receiving of image data from the controller 110 and sending/receiving of control commands.

The RAM 302 that is used for a work, the ROM 303 that stores therein computer programs, and the I/O control unit 304 are connected to each other via a bus 309. According to instructions received from the CPU 301, the I/O control unit 304 performs various operations of drive motors, clutches, solenoids, sensors, etc., that drive loads 305. The loads 305 include, for example, a data read/write mechanism and the secondary-transfer-unit moving mechanism.

The transfer driving motor I/F **306*a* outputs, according to a driving instruction received from the CPU 301, an instruction signal to the driver 307*a* to set a frequency of a driving pulse signal. A driving motor M1 rotates according to the frequency. By this rotation, the driving roller 17 shown in FIG. 2 rotates. The transfer driving motor I/F 306*b* outputs, according to a driving instruction received from the CPU 301, an instruction signal to the driver 307*b* to set a frequency of a driving pulse signal. A driving motor M2 rotates according to the frequency. By this rotation, the driving roller 25 shown in FIG. 2** rotates.

The RAM 302 is used as a work area to execute a computer program stored in the ROM 303. Because the RAM 302 is a volatile memory, parameters that are used for next belt driving, such as an amplitude and a phase value, are stored in a nonvolatile memory, such as an electrically erasable programmable read only memory (EEPROM) (not shown). When the power is on or the driving roller 17 starts rotating, data about a belt cycle is loaded on the RAM 302 using a sine function or an approximate expression.

The computer program executed by the printer unit 300 according to the present embodiment is, for example, made up of modules that implement a print control unit 51, a positional-alignment control unit 52, an indirect-transfer control unit 53, a direct-transfer control unit 54, a secondary-transfer control unit 55, etc. (see FIG. 5). These units will be described in detail later. When the CPU 301 reads the computer program from the above-described ROM 303 and executes the computer program, the above modules are loaded and created on a main memory thereby implementing the print control unit 51, the positional-alignment control unit 52, the indirect-transfer control unit 53, the direct-transfer control unit 54, the secondary-transfer control unit 55, etc.

Figure 5:
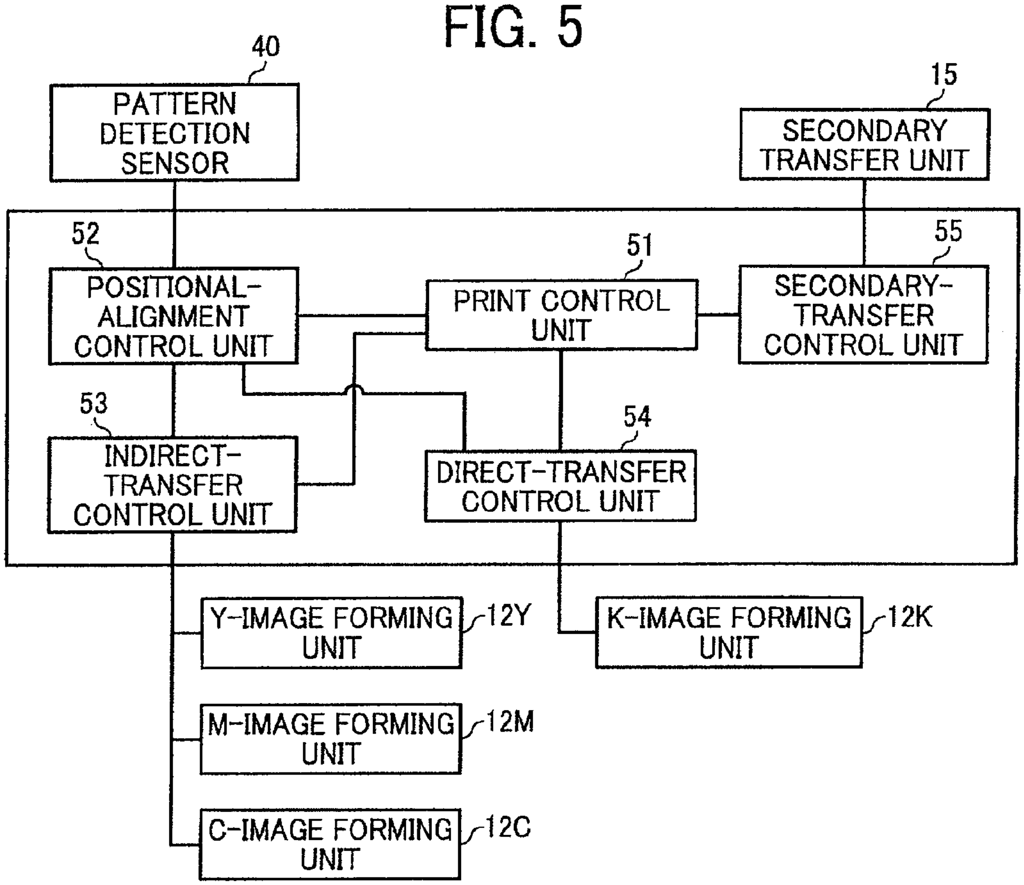
FIG. 5 is a block diagram of the functional configuration of the printer unit.

FIG. 5 is a block diagram of the functional configuration of the printer unit 300. The printer unit 300 includes the print control unit 51, the positional-alignment control unit 52, the indirect-transfer control unit 53, the direct-transfer control unit 54, the secondary-transfer control unit 55, etc.

The print control unit 51 controls the system, more particularly, the positional-alignment control unit 52, the indirect-transfer control unit 53, the direct-transfer control unit 54, the secondary-transfer control unit 55, etc., to perform a full-color printing process and a monochrome printing process, and a positional-alignment process.

During the full-color printing, the indirect-transfer control unit 53 causes the image forming units 12Y, 12M, and 12C and the intermediate transfer belt 6 to transfer the Y, M, and C images onto the intermediate transfer belt 6. The Y, M, and C images will be transferred onto the transfer sheet P later.

During the positional-alignment process, the indirect-transfer control unit 53 causes the image forming units 12Y, 12M, and 12C for yellow, magenta, and cyan and the intermediate transfer belt 6 to transfer each of the positional alignment patterns 13Y, 13M, and 13C (see FIG. 6) onto the intermediate transfer belt 6.

Figure 6:
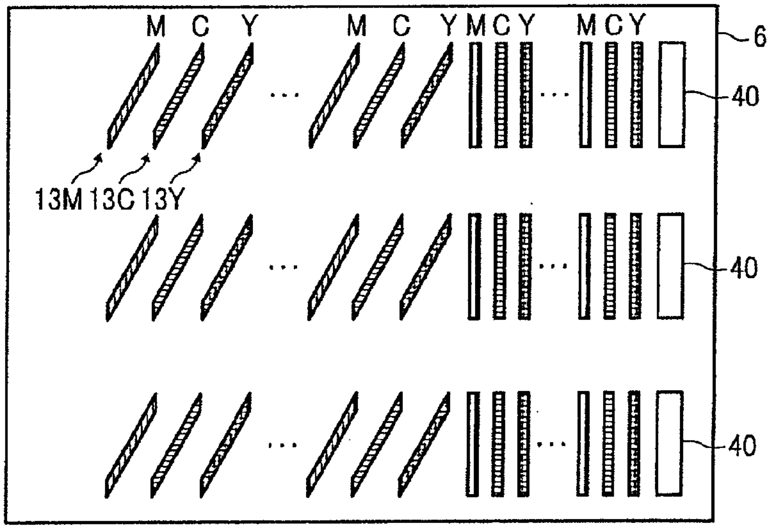
FIG. 6 is a plan view of the surface of the intermediate transfer belt when yellow, magenta, and cyan positional alignment patterns are formed thereon.

FIG. 6 is a plan view of the surface of the intermediate transfer belt 6 when the positional alignment patterns 13Y, 13M, and 13C are formed thereon by the photosensitive elements 1Y, 1M, and 1C. As shown in FIG. 6, the positional alignment patterns 13Y, 13M, and 13C include, for example, three up-and-down line patterns and three slant line patterns spaced a fixed distance away from each other with respect of the sub-scanning direction. Several sets of the positional alignment patterns 13Y, 13M, and 13C are arranged in the moving direction of the intermediate transfer belt 6. As shown in FIG. 6, in order to reduce effects caused by an error, several sets of the positional alignment patterns 13 are formed as samples in accordance with the positions of the pattern detection sensors 40.

More particularly, the indirect-transfer control unit 53 causes the exposure device 5 to expose the surfaces of the photosensitive elements 1Y, 1M, and 1C that have been charged evenly and positively by the charging devices 2Y, 2M, and 2C, thereby forming, because the exposed parts are charged negatively, latent images for yellow, magenta, and cyan on the photosensitive elements 1Y, 1M, and 1C, respectively. The indirect-transfer control unit 53 adjusts the difference between the potential of each of the developing devices 3Y, 3M, and 3C and the potential of the corresponding photosensitive element 1Y, 1M, or 1C and develops the negatively charged latent images formed on the photosensitive elements 1Y, 1M, and 1C with positively charged yellow, magenta, cyan toners, respectively. After that, the indirect-transfer control unit 53 adjusts the difference between the potential of each of the photosensitive elements 1Y, 1M, and 1C and the potential of the intermediate transfer belt 6 (or the driven rollers 21Y, 21M, and 21C) and transfers the various color toner images from the photosensitive elements 1Y, 1M, and 1C onto the negatively charged intermediate transfer belt 6. Thus, the Y, M, and C toner images are formed on the intermediate transfer belt 6 in a superimposed manner.

During the full-color printing and the monochrome printing, the direct-transfer control unit 54 causes the image forming unit 12K for black and the transfer-sheet conveying belt 8 to transfer the K toner image directly onto the transfer sheet P.

During the positional-alignment process, the direct-transfer control unit 54 causes the image forming unit 12K for black and the transfer-sheet conveying belt 8 to transfer the black positional alignment pattern 13K (see FIG. 7) onto the transfer-sheet conveying belt 8.

More particularly, the direct-transfer control unit 54 causes the exposure device 5 to expose the surface of the photosensitive element 1K that has been charged evenly and positively by the charging device 2K, thereby forming, because the exposed parts are charged negatively, a latent image for black on the photosensitive element 1K. The indirect-transfer control unit 53 adjusts the difference between the potential of the developing device 3K and the potential of the photosensitive element 1K and develops the negatively charged latent image formed on the photosensitive element 1K with positively charged black toners. After that, the indirect-transfer control unit 53 adjusts the difference between the potential of the photosensitive element 1K and the potential of the transfer-sheet conveying belt 8 (or the driven roller 21K) and transfers the K toner image from the photosensitive element 1K onto either the negatively charged transfer-sheet conveying belt 8 or the transfer sheet P moving by the rotation of the transfer-sheet conveying belt 8.

Figure 7:
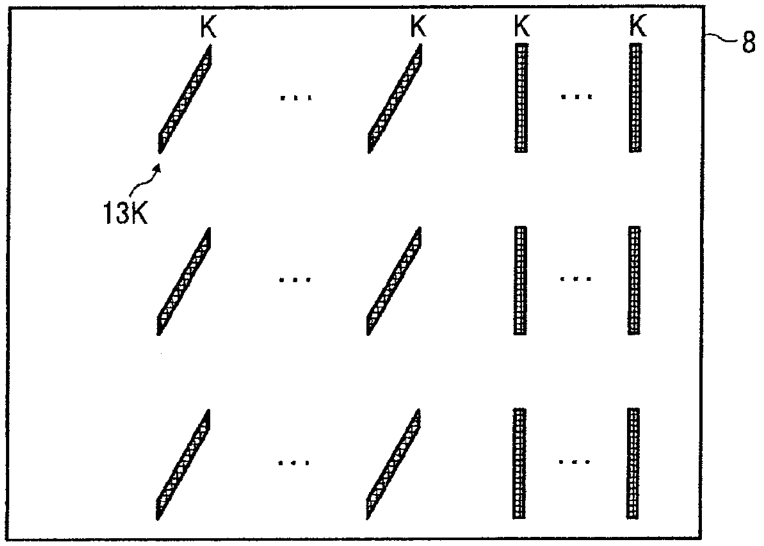
FIG. 7 is a plan view of the surface of a transfer-sheet conveying belt when a black positional alignment pattern is formed thereon.

FIG. 7 is a plan view of the surface of the transfer-sheet conveying belt 8 when the black positional alignment pattern 13K is formed thereon. As shown in FIG. 7, the positional alignment pattern 13K includes, for example, up-and-down line patterns and slant line patterns spaced a fixed distance away from each other with respect of the sub-scanning direction. Several sets of these patterns are arranged in the moving direction of the transfer-sheet conveying belt 8.

Depending on the selected process from among the full-color printing process, the monochrome printing process, and the positional-alignment process, the secondary-transfer control unit 55 causes the secondary transfer roller 28 of the secondary transfer unit 15 to set the transfer-sheet conveying belt 8 and the intermediate transfer belt 6 close to or away from each other.

The secondary-transfer control unit 55 adjusts the difference between the potential of the driving roller 17 and the potential of the secondary transfer roller 28 and transfers, after the Y, M, and C toner images have been transferred onto the intermediate transfer belt 6 as a primary transfer, the Y, M, and C toner images onto the transfer sheet P moving due to the rotation of the transfer-sheet conveying belt 8 as a secondary transfer. After that, the secondary-transfer control unit 55 adjusts the potential of the driving roller 17 and the potential of the secondary transfer roller 28 and transfers, after the K toner image has been transferred onto the transfer-sheet conveying belt 8 as a primary transfer, the K toner image onto the intermediate transfer belt 6 as a secondary transfer.

As shown in FIG. 2, the driving roller 17 is grounded. The secondary-transfer control unit 55 can select the direction of attractive force used in a secondary transfer by switching the bias applied to the secondary transfer roller 28. For example, the secondary transfer roller 28 is connected to either a positive power supply or a negative power supply via a switch SW. By switching the switch SW, the bias applied to the secondary transfer roller 28 is switched between the positive bias and the negative bias.

More particularly, during the full-color printing, the secondary-transfer control unit 55 moves the secondary transfer roller 28 close to the intermediate transfer belt 6 so that the toner image is transferred from the intermediate transfer belt 6 onto the transfer sheet P. During the full-color printing, the secondary-transfer control unit 55 adjusts the difference between the potential of the driving roller 17 and the potential of the secondary transfer roller 28 and transfers the Y, M, and C toner images from the intermediate transfer belt 6 onto the transfer sheet P moving due to the rotation of the transfer-sheet conveying belt 8 (secondary transfer).

If, for example, the various color toner images formed on the intermediate transfer belt 6 are positively charged, the secondary-transfer control unit 55 connects the switch SW to the negative power supply and applies the negative bias to the secondary transfer roller 28. The positively charged various color toner images are, in turn, transferred onto the transfer-sheet conveying belt 8 by attractive force toward the secondary transfer roller 28 (secondary transfer). The Y, M, and C toner images are superimposed on the K image that is already present on the transfer sheet P due to the transfer by the direct-transfer control unit 54 and, thus, a full-color image is formed on the transfer sheet P.

During the monochrome printing, because no Y, M, and C toner images are transferred onto the transfer sheet P, the secondary-transfer control unit 55 moves the secondary transfer roller 28 away from the intermediate transfer belt 6. Because unnecessary friction between the belts is reduced, this configuration is effective to increases the lifetime of the belts.

During the positional alignment process, the secondary-transfer control unit 55 moves the secondary transfer roller 28 close to the intermediate transfer belt 6. During the positional alignment process, the secondary-transfer control unit 55 adjusts the difference between the potential of the driving roller 17 and the potential of the secondary transfer roller 28 and transfers the K toner image from the transfer-sheet conveying belt 8 onto the intermediate transfer belt 6 (secondary transfer).

If, for example, the K toner image formed on the transfer-sheet conveying belt 8 is positively charged, the secondary-transfer control unit 55 connects the switch SW to the positive power supply and applies the positive bias to the secondary transfer roller 28. The positively charged K toner image is, in turn, transferred onto the intermediate transfer belt 6 by repulsive force away from the secondary transfer roller 28 and attractive force toward the grounded driving roller 17 (secondary transfer).

Figure 8:
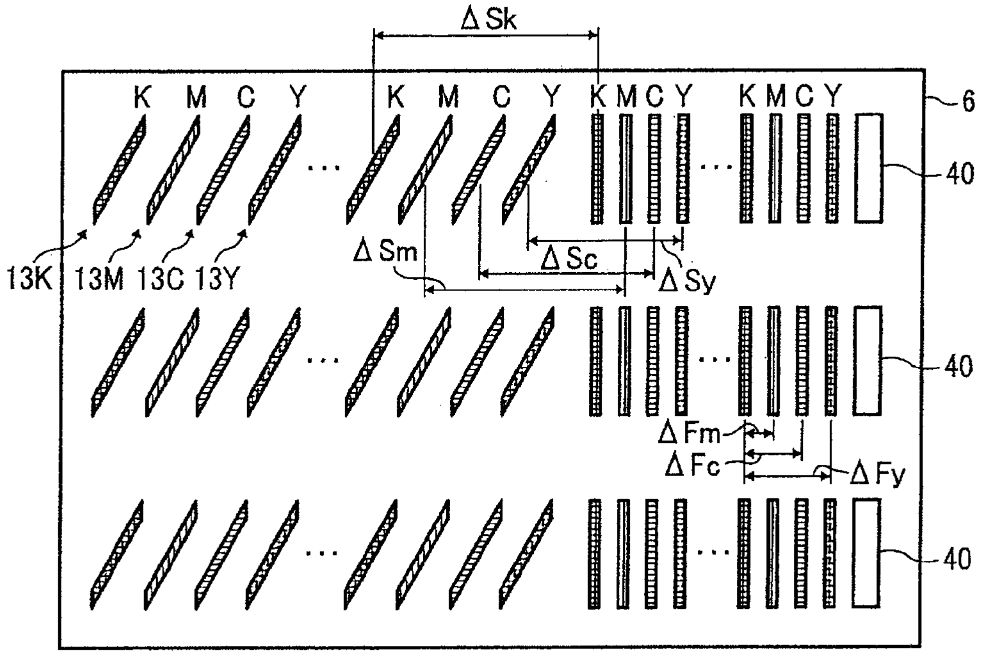
FIG. 8 is a plan view of the surface of the intermediate transfer belt when all the yellow, magenta, cyan, and black positional alignment patterns are formed thereon.

The black positional alignment pattern 13K is superimposed on the yellow, magenta, and cyan positional alignment patterns 13Y, 13M, and 13C that are already present on the intermediate transfer belt 6 by operation of the indirect-transfer control unit 53 (see FIG. 8) and, thus, the positional alignment pattern 13 includes all the color-based positional alignment patterns is formed on the intermediate transfer belt 6. FIG. 8 is a plan view of the surface of the intermediate transfer belt 6 on which all the positional alignment patterns 13Y, 13M, 13C, and 13K are formed.

As shown in FIG. 2, the position (primary transfer position) at which the positional alignment pattern 13K is directly transferred onto the transfer-sheet conveying belt 8 (the position at which the photosensitive element 1K and the driven roller 21K come most close to each other) is upstream, with respect to the moving direction of the transfer sheet P, of the position (secondary transfer position) at which the positional alignment pattern 13K is transferred from the transfer-sheet conveying belt 8 onto the intermediate transfer belt 6 (the position at which the driving roller 17 and the secondary transfer roller 28 come most close to each other).

This arrangement is effective to decrease the period between when the positional alignment pattern 13K is transferred onto the transfer-sheet conveying belt 8 and when the positional alignment pattern 13K is transferred onto the intermediate transfer belt 6 as the secondary transfer, which results in decreasing the time for the positional alignment process.

During the positional alignment process, the positional-alignment control unit 52 detects all the positional alignment patterns 13Y, 13M, 13C, and 13K on the intermediate transfer belt 6 using the pattern detection sensors 40, calculates the amount of misalignment of each color, and corrects the misalignment of each color in accordance with the calculated amount of misalignment.

More particularly, the positional-alignment control unit 52 calculates, using a timer of the CPU 101, the period between when each up-and-down line pattern is detected by the pattern detection sensor 40 and when the slant line pattern in the same color is detected by the pattern detection sensor 40 and calculates the distance between each up-and-down line pattern and the corresponding slant line pattern (hereinafter, distances ΔSy, ΔSm, ΔSc, and ΔSk) (see FIG. 8) on the basis of the calculated period. The positional-alignment control unit 52 calculates the amount of main-scanning directional misalignment of each color by comparing the calculated distances ΔSy, ΔSm, ΔSc, and ΔSk with their reference values that are stored in a memory.

The positional-alignment control unit 52 calculates, using the timer of the CPU 101, the period between when each of the yellow, magenta, and cyan positional alignment patterns 13Y, 13M, and 13C is detected by the pattern detection sensor 40 and when the reference positional alignment pattern or the black positional alignment pattern 13K is detected by the pattern detection sensor 40 and calculates, in accordance with the calculated period, the distance between the positional alignment patterns 13K and 13Y (hereinafter, "distance ΔFy"), the distance between the positional alignment patterns 13K and 13M (hereinafter, "distance ΔFm"), and the distance between the positional alignment patterns 13K and 13C (hereinafter, "distance ΔFc"). The positional-alignment control unit 52 then calculates the amount of sub-scanning directional misalignment and the correction value for each of yellow, magenta, and cyan when black is assumed referential by comparing the calculated distances ΔFy, ΔFm, and ΔFc with the reference values of ΔFy, ΔFm, and ΔFc, respectively. The reference values of ΔFy, ΔFm, and ΔFc are stored in a memory.

Using the calculated main-scanning directional correction value and the calculated sub-scanning directional correction value, the positional-alignment control unit 52 adjusts the main-scanning directional and sub-scanning directional positions and the skews, thereby adjusting the positions of the images formed by the image forming units 12Y, 12M, 12C, and 12K.

The operations of the system (the positional-alignment control unit 52, the indirect-transfer control unit 53, the direct-transfer control unit 54, and the secondary-transfer control unit 55) under the control of the print control unit 51 during the color printing, the monochrome printing, and the positional alignment process are described below.

First of all, the operations of the system under the control of the print control unit 51 during the full-color printing are described below. During the full-color printing, the print control unit 51 controls the indirect-transfer control unit 53, the direct-transfer control unit 54, the secondary-transfer control unit 55, etc.

The print control unit 51 causes the indirect-transfer control unit 53 to form the Y, M, and C toner images on the intermediate transfer belt 6. The print control unit 51 causes the direct-transfer control unit 54 to form the K toner image on the transfer-sheet conveying belt 8 and then transfer the K toner image directly onto the transfer sheet P moving due to the rotation of the transfer-sheet conveying belt 8.

The print control unit 51 causes the secondary-transfer control unit 55 to move the secondary transfer roller 28 close to the intermediate transfer belt 6. The control of the print control unit 51 causes the secondary-transfer control unit 55 to transfers, as a secondary transfer, the Y, M, and C toner images from the intermediate transfer belt 6 to the transfer sheet P moving due to the rotation of the transfer-sheet conveying belt. The Y, M, and C toner images are superimposed on the K toner image and, thus, the full-color toner image is formed on the transfer sheet P.

In other words, the transfer-sheet conveying belt 8 is the direct-transfer belt to which the K toner image is transferred as a primary transfer, while the transfer-sheet conveying belt 8 is the secondary-transfer belt to which the Y, M, and C toner images are transferred from the intermediate transfer belt 6 as a secondary transfer.

The print control unit 51 conveys the transfer sheet P to the fixing device 10 and, in turn, the Y, M, C toner images are fixed onto the transfer sheet P. Thus, the full-color image printing process is completed. Under the control of the print control unit 51, the transfer sheet P with the fixed image is conveyed to a conveying path R1 (see FIG. 1A), and then discharged, by a pair of discharge rollers 30, with the image-forming side down onto a discharge tray 31. If the duplex printing mode is selected, under the control of the print control unit 51, the transfer sheet P is conveyed to a conveying path R2 by operation of a switching claw (not shown). The transfer sheet P is, in turn, inverted when passed through a duplex printing unit 34 and then conveyed to the registration rollers 24. After that, the transfer sheet P passes along the discharge path in the same manner as it passes through during the single-side printing.

The system operations under the control of the print control unit 51 during the monochrome printing are described below. During the monochrome printing, the print control unit 51 controls the direct-transfer control unit 54, the secondary-transfer control unit 55, etc.

More particularly, the print control unit 51 causes the secondary-transfer control unit 55 to set the secondary transfer roller 28 and the intermediate transfer belt 6 away from each other. Moreover, the print control unit 51 causes the direct-transfer control unit 54 to transfer the K toner image directly onto the transfer sheet P moving due to the rotation of the transfer-sheet conveying belt 8, thereby forming a monochrome image on the transfer sheet P. The print control unit 51 conveys the transfer sheet P to the fixing device 10 and, in turn, the K toner image is fixed onto the transfer sheet P. Thus, the monochrome-image printing process is completed.

After the fixing, under the control of the print control unit 51, the transfer sheet P is conveyed to the conveying path R1 (see FIG. 1A) and then discharged, by the discharge rollers 30, with the image-forming side down onto the discharge tray 31. If the duplex printing mode is selected, under the control of the print control unit 51, the transfer sheet P is conveyed to the conveying path R2 by operation of the switching claw (not shown). The transfer sheet P is, in turn, inverted when passed through the duplex printing unit 34 and then conveyed to the registration rollers 24. After that, the transfer sheet P passes along the discharge path in the same manner as it passes through during the single-side printing.

The system operations under the control of the print control unit 51 during the positional alignment process are described below. During the positional alignment process, the print control unit 51 controls the indirect-transfer control unit 53, the direct-transfer control unit 54, the secondary-transfer control unit 55, the positional-alignment control unit 52, etc.

The print control unit 51 starts the positional alignment process when receiving a positional alignment instruction from the user via the operation unit 400 or a predetermined time after.

The print control unit 51 causes the indirect-transfer control unit 53 to form the yellow, magenta, and cyan positional alignment patterns 13Y, 13M, and 13C on the intermediate transfer belt 6. In parallel, the print control unit 51 causes the direct-transfer control unit 54 to form the black positional alignment pattern 13K on the transfer-sheet conveying belt 8.

Moreover, the print control unit 51 causes the secondary-transfer control unit 55 to move the secondary transfer roller 28 close to the intermediate transfer belt 6. The print control unit 51 causes the secondary-transfer control unit 55 to transfer the black positional alignment pattern 13K (see FIG. 7) from the transfer-sheet conveying belt 8 onto the intermediate transfer belt 6 as the secondary transfer. The black positional alignment pattern 13K is superimposed on the yellow, magenta, and cyan positional alignment patterns 13Y, 13M, and 13C (see FIG. 6) and, thus, all the positional alignment patterns 13Y, 13M, 13C, and 13K are formed on the intermediate transfer belt 6 as shown in FIG. 8.

The control of the print control unit 51 causes the positional-alignment control unit 52 to detect all the positional alignment patterns 13Y, 13M, 13C, and 13K using the pattern detection sensors 40 and corrects the misalignment of each color.

Figure 9:
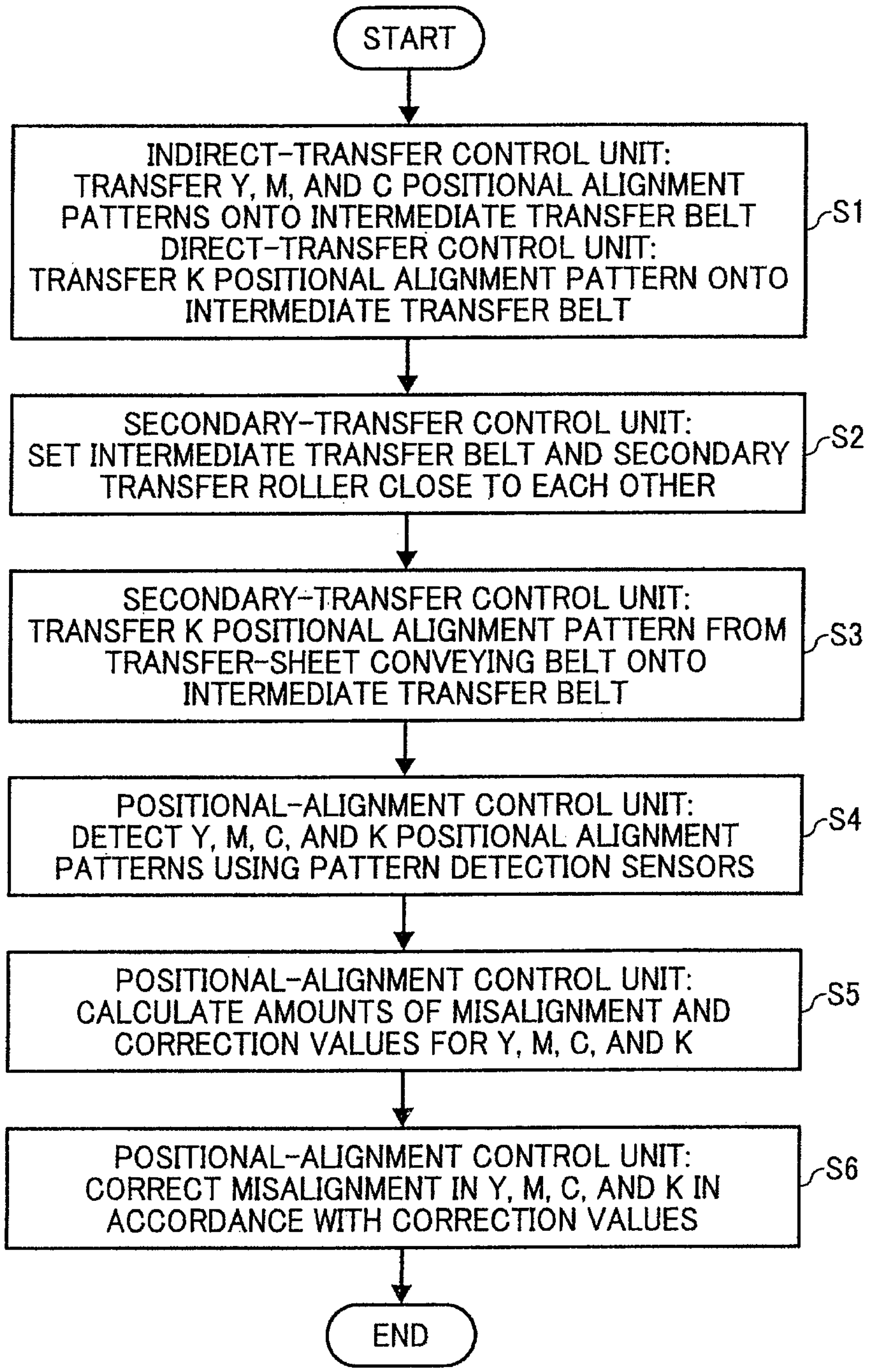
FIG. 9 is a flowchart of a positional alignment process performed by the MFP according to the present embodiment.

The positional alignment process performed by the MFP 100 according to the present embodiment is described below. FIG. 9 is a flowchart of the positional alignment process performed by the MFP 100.

The print control unit 51 starts the positional alignment process when receiving a positional alignment instruction from the user via the operation unit 400 or a predetermined time after.

The indirect-transfer control unit 53 causes the image forming units 12Y, 12M, and 12C to transfer the yellow, magenta, and cyan positional alignment patterns 13Y, 13M, and 13C (see FIG. 6) onto the intermediate transfer belt 6 (Step S1). In parallel, the direct-transfer control unit 54 causes the image forming unit 12K to transfer the black positional alignment pattern 13K (see FIG. 7) onto the transfer-sheet conveying belt 8 (Step S1).

After that, the secondary-transfer control unit 55 sets the transfer-sheet conveying belt 8 and the intermediate transfer belt 6 close to each other enough to transfer the image from the transfer-sheet conveying belt 8 onto the intermediate transfer belt 6 (Step S2). The secondary-transfer control unit 55 adjusts the difference between the potential of driving roller 17 and the potential of the secondary transfer roller 28 and transfers the positional alignment pattern 13K from the transfer-sheet conveying belt 8 onto the intermediate transfer belt 6 as the secondary transfer so that the positional alignment pattern 13K is superimposed on the positional alignment patterns 13Y, 13M, and 13C (Step S3).

The positional-alignment control unit 52 detects, using the pattern detection sensors 40, the misalignment in each of the positional alignment patterns 13Y, 13M, 13C, and 13K formed on the intermediate transfer belt 6 (Step S4) and calculates the correction values (Step S5). The positional-alignment control unit 52 adjusts the main-scanning directional and sub-scanning directional positions and the skews using the correction values and corrects the positions of the images formed by the image forming units 12Y, 12M, 12C, and 12K (Step S6). Thus, the positional alignment process is completed.

As described above, the MFP 100 according to the present embodiment forms all the positional alignment patterns 13Y, 13M, 13C, and 13K on the intermediate transfer belt 6. Therefore, the pattern detection sensors 40 near the intermediate transfer belt 6 can detect every positional alignment pattern 13. In other words, it is unnecessary to arrange sensors in both the direct-transfer system and the indirect-transfer system, which allows the configuration of the MFP 100 simplified Moreover, as described above, the pattern detection sensors 40, the intermediate transfer belt 6, and the image forming units 12Y, 12M, and 12C together form the indirect transfer unit 50, which allows the configuration of the MFP 100 simplified and results in easy maintenance operations.

The indirect-transfer control unit 53, the direct-transfer control unit 54, and the secondary-transfer control unit 55 can use some other bias applying manners. For example, one bias applying manner can be used for a secondary transfer that involves charging toners negatively and applying a negative bias, which is opposite to the bias applied in the above example, to the secondary transfer roller 28. Although, in the above description, the bias directions of the intermediate transfer belt 6 and the transfer-sheet conveying belt 8 are opposite to each other, i.e., when the bias direction of one belt is positive, the bias direction of the other belt is negative, the bias directions can be the same if the difference between the potential of the intermediate transfer belt 6 and the potential of the transfer-sheet conveying belt 8 is large enough to transfer the toner image as a secondary transfer.

Although, in the above-described positional alignment process, the positions of all the color-based images including the Y, M, C, and K images are adjusted, the configuration is not limited thereto. The positions of two or more color-based images, for example, only the K and Y images can be adjusted.

According to the present invention, an image formed on an intermediate transfer medium is detected by a sensor and misalignment of the image is corrected; therefore, no sensor is needed other than the sensor that is arranged near the intermediate transfer medium. Therefore, an image forming apparatus can be provided that includes both a direct-transfer system and an indirect-transfer system but still has a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a direct-transfer control unit that causes a direct-transfer medium and a first image forming unit that forms a single-color image to transfer the single-color image onto either the direct-transfer medium or a transfer sheet, wherein both the direct-transfer medium and the transfer sheet move due to rotation of the direct-transfer medium;

an indirect-transfer control unit that causes an intermediate transfer medium and a second image forming unit that forms a multi-color image to transfer the multi-color image onto the intermediate transfer medium;

a secondary-transfer control unit that transfers, as a secondary transfer and after the single-color image has been transferred onto the direct-transfer medium under the control of the direct-transfer control unit, the single-color image onto the intermediate transfer medium;

a sensor that detects the single-color image and the multi-color image on the intermediate transfer medium; and a positional-alignment control unit that calculates, using the sensor, an amount of misalignment of the single-color image and the multi-color image and corrects, using a position of an image formed by the first image forming unit as a reference position, positions of images to be formed by the second image forming unit in accordance with the calculated amount of misalignment.

2. The image forming apparatus according to claim 1, wherein the sensor, the second image forming unit that is under the control of the indirect-transfer control unit, and the intermediate transfer medium together form an indirect-transfer unit and the indirect-transfer unit is detachable.

3. The image forming apparatus according to claim 1, wherein the secondary-transfer control unit sets the direct-transfer medium and the intermediate transfer medium close to or away from each other and transfers, as a secondary transfer, the single-color image from the direct-transfer medium to the intermediate transfer medium.

4. The image forming apparatus according to claim 1, wherein a position on the direct-transfer medium to which the single-color image is transferred by the direct-transfer control unit is upstream, with respect to the moving direction of the transfer sheet, of a position on the intermediate transfer medium to which the single-color image is transferred from the direct-transfer medium.

5. The image forming apparatus according to claim 1, wherein the sensor is arranged near a position that the intermediate transfer medium passes by immediately after the single-color image has been transferred from the direct-transfer medium onto the intermediate transfer medium.

6. The image forming apparatus according to claim 1, wherein the first image forming unit that is under the control of the direct-transfer control unit forms a black image.

7. An image forming method performed by an image forming apparatus that includes a sensor and detects an image on an intermediate transfer medium using the sensor, the image forming method comprising:

transferring, by both a direct-transfer medium and a first image forming unit that forms a single-color image, the single-color image onto either the direct-transfer medium or a transfer sheet, wherein both the direct-transfer medium and the first image forming unit are under the control of a direct-transfer control unit and both the direct-transfer medium and the transfer sheet move due to the rotation of the direct-transfer medium;

transferring, by both an intermediate transfer medium and a second image forming that forms a multi-color image, the multi-color image onto the intermediate transfer medium, wherein both the indirect-transfer medium and the second image forming unit are under the control of an indirect-transfer control unit;

transferring, as a secondary transfer by a secondary-transfer control unit, after the single-color image has been transferred by the direct-transfer control unit onto the direct-transfer medium, the single-color image onto the intermediate transfer medium; and calculating, by a positional-alignment control unit using the sensor, an amount of misalignment of the single-color image and the multi-color image and correcting, using a position of an image formed by the first image forming unit as a reference position, positions of images to be formed by the second image forming unit in accordance with the calculated amount of misalignment.

8. A computer program product comprising a non-transitory computer-usable medium having computer-readable program codes embodied in the medium for forming an image in an image forming apparatus that includes a sensor and detects an image on an intermediate transfer medium using the sensor, the program codes when executed causing a computer to execute:

transferring, by both a direct-transfer medium and a first image forming unit that forms a single-color image, the single-color image onto either the direct-transfer medium or a transfer sheet, wherein both the direct-transfer medium and the first image forming unit are under the control of a direct-transfer control unit and both the direct-transfer medium and the transfer sheet move due to the rotation of the direct-transfer medium;

transferring, by both an intermediate transfer medium and a second image forming that forms a multi-color image, the multi-color image onto the intermediate transfer medium, wherein both the indirect-transfer medium and the second image forming unit are under the control of an indirect-transfer control unit;

transferring, as a secondary transfer by a secondary-transfer control unit, after the single-color image has been transferred by the direct-transfer control unit onto the direct-transfer medium, the single-color image onto the intermediate transfer medium; and calculating, by a positional-alignment control unit using the sensor, an amount of misalignment of the single-color image and the multi-color image and correcting, using a position of an image formed by the first image forming unit as a reference position, positions of images to be formed by the second image forming unit in accordance with the calculated amount of misalignment.

* * * * *